US008426022B2

(12) United States Patent
Schaefer

(10) Patent No.: US 8,426,022 B2
(45) Date of Patent: Apr. 23, 2013

(54) COATED LEATHER

(75) Inventor: Philipp Schaefer, Hannover (DE)

(73) Assignee: LANXESS Deutschland GmbH, Leverkusen (DE)

( * ) Notice: Subject to any disclaimer, the term of this patent is extended or adjusted under 35 U.S.C. 154(b) by 410 days.

(21) Appl. No.: 12/682,619

(22) PCT Filed: Sep. 11, 2008

(86) PCT No.: PCT/EP2008/007485
§ 371 (c)(1), (2), (4) Date: Jun. 30, 2010

(87) PCT Pub. No.: WO2009/049728
PCT Pub. Date: Apr. 23, 2009

(65) Prior Publication Data

US 2010/0263235 A1 Oct. 21, 2010

(30) Foreign Application Priority Data

| | | |
|---|---|---|
| Oct. 12, 2007 | (AT) | 620/2007 U |
| Feb. 12, 2008 | (AT) | 83/2008 U |
| May 9, 2008 | (AT) | A 756/2008 |
| May 30, 2008 | (DE) | 20 2008 007 288 U |

(51) Int. Cl.
*B32B 5/16* (2006.01)

(52) U.S. Cl.
USPC .......... 428/403; 428/15; 428/327; 428/423.4; 428/473

(58) Field of Classification Search .................. 428/403, 428/15, 327, 423.4, 473
See application file for complete search history.

(56) References Cited

U.S. PATENT DOCUMENTS

| | | | | |
|---|---|---|---|---|
| 6,177,198 | B1 * | 1/2001 | Schaefer | 428/423.4 |
| 6,733,877 | B2 * | 5/2004 | Schaefer | 428/327 |
| 6,953,621 | B2 * | 10/2005 | Schaefer | 428/305.5 |
| 2007/0082176 | A1 | 4/2007 | Schaefer | |

FOREIGN PATENT DOCUMENTS

| | | | |
|---|---|---|---|
| AT | 7408 | U1 | 3/2005 |
| DE | 29812075 | U1 | 9/1998 |
| WO | 2005047549 | A1 | 5/2005 |
| WO | WO2005/047549 | * | 5/2005 |

* cited by examiner

*Primary Examiner* — Leszek Kiliman
(74) *Attorney, Agent, or Firm* — Michael A. Miller

(57) ABSTRACT

A coated leather, in particular split cowhide leather, has a preferably nubuck-like appearing surface structure. The coating is formed with a surface layer formed with a mechanically and moisture-stable polymer and bonded to the surface of the leather or split leather by a polymer-based bonding layer. The outer layer is notable for inner smoothness and is formed with soft polyurethane. It includes in the non-embossed region microdepressions which are essentially closed in the direction of the leather but are open towards the outside, have an internal width of less than 130 μm and are arranged close-packed to each other in the manner of soapy foam cells. The microdepressions are each separately bounded by thin mutually crosslinked stays which have on the outside a matt or finely fibrous fine-roughness structure surface, and have an essentially semispherical-shaped concave inner surface which faces outward and is smooth. The coating may include two or more layers that are riveted to each other by way of pins or the like that are anchored in pores.

72 Claims, 10 Drawing Sheets

FIG. 3
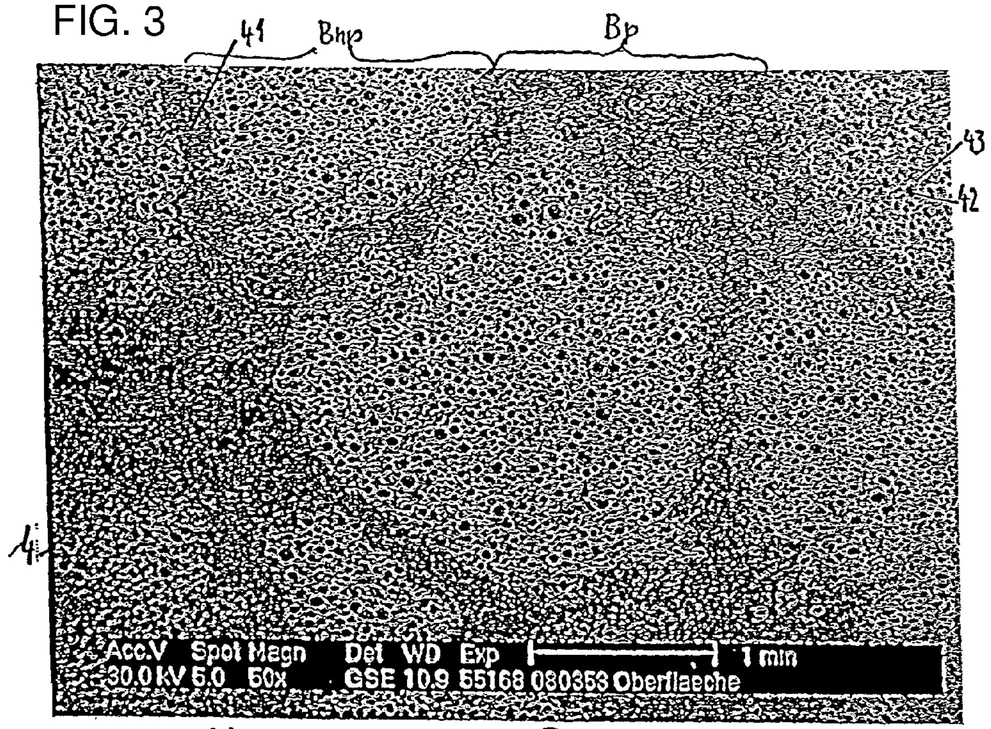
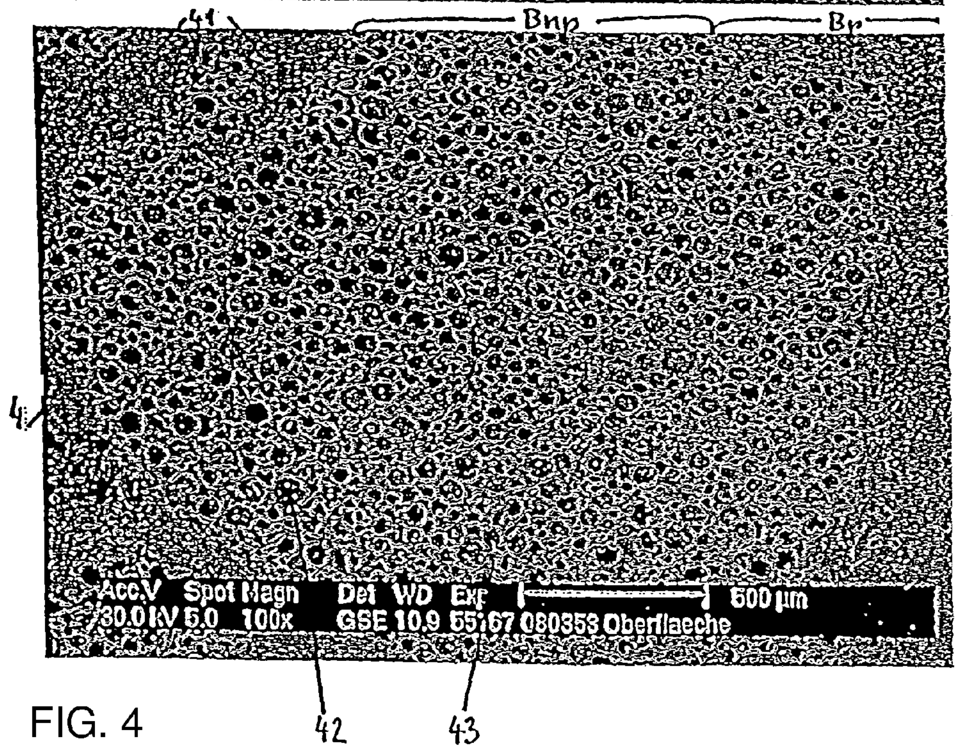
FIG. 4

COATED LEATHER

BACKGROUND OF THE INVENTION

Field of the Invention

The invention at hand relates to a novel coated leather, preferably a split leather, in particular a split cowhide, in accordance with the preamble of claim 1, having the features mentioned in the characteristics of said claim.

It relates to a leather that is characterized by a perfect nubuck feel and nubuck visual appearance; that is intended for use in shoes, sandals and special shoes, in saddles for motorcycles and bicycles as well as in the interior trim and upholstery of boats, in medical and hospital equipment and the like, and moreover in the coverings of structural components of the interior equipment of vehicles; and that has a new, nubuck-like visual as well as haptic quality.

It relates in particular to such a leather that meets the specific requirements of the vehicle sector to the highest degree and which furthermore meets the stringent requirements of group 1 and 2 safety footgear.

The new coated leather is modeled on genuine nubuck leather: the latter is made by grinding the shagreened upper side. During this process, fine fibers are formed and the surface becomes matte and fine-grained rough. Nubuck leather, in its new state, has an interesting and beautiful visual appearance and optimal haptics.

However, major disadvantages of genuine nubuck leather lie in the fact that haptics and visual appearance change towards the negative with and through use after a short time. The originally fine-grained and elegantly matte surface quickly becomes greasy. This will lead to the pleasant touch being lost as well. Genuine nubuck leathers intrinsically soil very quickly; watery stains leave spots and borders that can no longer be removed. Lightfastness of genuine nubuck leathers is insufficient to poor. Color abrasion properties in their dry state are poor, and even more so when wet.

Abrasion resistance is insufficient especially in the case of safety shoes and athletic shoes because even after a short time of use of the shoes, abrasion wear and tear shows at the locations of stress which always goes hand in hand with discoloration.

For these reasons, genuine nubuck leather is almost never used particularly in the vehicle sector, and in the case of shoes and other basic commodities, the leathers are impregnated with oily and wax-like substances which improves their usage properties but which also considerably degrades their visual appearance and haptics.

BRIEF SUMMARY OF THE INVENTION

The objective of the invention was to create a leather whose surface matches the surface of a genuine nubuck leather with regard to visual appearance and haptics without having its disadvantages in terms of limited usability as described above.

The objectives of the invention moreover include the fact that the new nubuck leather does not soil and that it does not become shiny even under extreme wear and tear and that it does not change its surface structure and its color.

It has been known per se to create nubuck-like surfaces on leather by providing the leather with a foam coating and subsequently grinding it. This process is cumbersome and expensive. Abrasive dust is created, and during the grinding, the surface changes its color.

However, the main disadvantage lies in the fact that very soft polymer foam coatings on the leather are difficult to grind. On the other hand, the softness of a polymer is an essential prerequisite for good haptics.

Moreover it has been known to laminate leathers with polyurethane foils produced by a coagulation method. These foils are thermoplastic, i.e. not abrasion resistant. Their cell structure is open-celled in sponge-like fashion so that dirt can enter easily and anchor itself to the cells, being hard to impossible to remove.

Furthermore, it has been known to provide leather with a polyurethane coating containing micro hollow spheres and to create on the surface a kind of nubuck effect through grinding. However, these surfaces do not provide a good grip because they are hard due to the fact that the shells of the ground micro hollow spheres are preserved. Also, grinding leads to discolorations and the grinding process is dirty and expensive. Here, too, the use of very soft polymers is impossible.

Furthermore it has been known to provide leathers with a nubuck-like surface through electrostatic tarnishing with textile fibers. The fibers tend to be not abrasion-resistant and the nubuck effect will soon be lost.

Moreover it has been known to create a nubuck effect on leather by producing in a reversal process in a silicon mold a foil made of polyurethane from which fine hairs made of the same material protrude and to attach this foil to the leather. These fine hairs have a microscopically rough surface, a diameter of maximally 100 μm and also tend to soil due to their roughness and arrangement. The haptics created thereby are per se of high quality as is the visual impression; however, the overall impression is closer to a textile velour material than a nubuck leather. With increased wear and tear, the fine hairs may be abraded and the surface becomes unattractive and loses its basically pleasant touch.

Surprisingly it was found out that in the case of leather, preferably split leather, all requirements and tasks demanded of it are fully met and the leather surface has the appearance and the haptics of a genuine nubuck surface if smooth, approximately semispherical micro indentations arranged in close proximity to each other and surrounded only by bar-like borders are present in the exterior layer; if moreover this external layer is made of a soft polyurethane; and if the indentations with their smooth surface or, respectively, the frame surfaces of the thin bar-like sheathing have a diameter of less than 130 μm.

The optimal nubuck surface is therefore a hybrid. Even though the smooth surfaces of the indentations are larger in terms of area than the matte surfaces of the sheathing bars, the surface has the same matte-like quality as natural nubuck leather. The naked eye will not notice the smooth surfaces of the micro indentations even if they are not only smooth but also shiny. The eye will only register a uniformly matte surface with the visual appearance of genuine nubuck leather. Nor are the micro-indentations perceived through touch. Due to the matte surfaces of the borders and their softness, the thin polymer surface has the feel of high-quality natural nubuck leather.

In an ascertainment of the degree of gloss in accordance with DIN 67530 measured at an incident angle of 60°, black nubuck leathers have a degree of gloss of between 0.1 and 0.4, likewise the leather in accordance with the invention. The same applies to measurements in other colors.

New and surprising is the fact that a perfect nubuck effect similar to a hybrid is created through the micro indentations and through the matte effect on the bar surfaces.

At this place it must be mentioned that the new coated leathers, preferably split leathers, with a coating may virtually have any surface structure, to wit from fine to coarse grained or with a technical surface structure.

DESCRIPTION OF THE INVENTION

In the case of the leather in accordance with the invention, the surface is made in particular of a soft cross-linked polyurethane, preferably on the basis of or, respectively, made of a solidified polyurethane dispersion that has been known per se, such as pigments and/or a silicon emulsion and/or dispersion. The surface was formed on a removable support made of silicon caoutchouc and firmly attached to the leather by means of one or several adhesive layers or, respectively, strata on a polyurethane basis. The adhesive layers or, respectively, layer strata are made of polyurethane dispersions, preferably of those having a crystalline structure.

The term "aggregate coating" comprises the exterior layer as well as the glue or adhesive layer which may be multilayered, i.e. having a middle layer stratum and a connecting layer stratum.

The new leather will not absorb any water via the surface; moreover it is excellently resistant to color abrasion in its dry as well as in its wet state, it is extremely resistant to mechanical wear and tear, and the individual layers or, respectively, layer strata will not separate even under extreme stress and under the influence of wetness. Also, it provides protection from wet soiling on the surface.

However, in addition to its nubuck-analogous appearance and feel, what characterizes the new leather in particular is its excellent general ability to repel dirt in spite of the exterior layer having a large number of pore-like indentations, the exterior layer being a foil with novel smooth, preferably glossy concave-spherical interior surfaces of the micro indentations.

The drastically decreased dirt absorption results from the smooth surface of the indentations as well as from the small cross section of their openings. Larger dirt particles can not penetrate in the first place. When moved, the soft elastic bars transport present dirt from the semispherical-like, hollow and internally smooth indentations. The fact that the thin bars are endlessly connected to each other, i.e. that no bar stands by itself, results in great wear and tear resistance.

A few supplemental words with regard to the dirt-repellent property of the new leathers: Even though the microstructure of the surfaces of the new leathers is per se the complete opposite of the known dirt-repellent lotus structure with the most delicate hairs, the new surfaces do not tend to soil and tend to be self-cleaning of dirt particles when moved and/or in the presence of water, which comes as a complete surprise.

In accordance with the invention, the indentations are smooth; their internal surface per se is preferably glossy. However, the overall surface of the new leather or, respectively, its optical appearance will always be matte, similar to genuine nubuck leather.

Moreover, the surface of the new leather is downright friendly to the touch and disposes of haptics that are found only in particularly high-quality nubuck leathers.

In addition, the new product not only has considerably improved abrasion and color abrasion properties but it also prevents or reduces creaking noises in addition to undesirable soiling, and above all, as already mentioned, its haptics are particularly positive. Add to this a new hybrid optical appearance which is apparently caused by the smooth, preferably glossy light-reflecting concave interior surfaces of the micro indentations as well as by the matte to fine-grained bar surfaces.

Great demands are made of coated leathers, preferably split leathers, with regard to adhesion properties as is; the new coated leather or, respectively, split leather, in accordance with the invention meets them without any problems. The known use of polyurethane dispersion with a crystalline structure which also contains a cross-linking agent for the glue or, respectively, adhesive layers or, respectively, layer strata leads to a nearly inseparable bonding with each other and with the leather, particularly if one of the glue or, respectively, adhesive layers is still wet prior to their being joined, i.e. prior to their being pressed together.

The complete coating preferably has a maximal thickness of only 0.15 mm so that the coated leather may be designated as "genuine leather". The overall coating may be double or multiple layered. A preferably provided very thin silicon plating will not be taken into account in this respect.

The objective that is met in accordance with the invention moreover includes the creation of a split leather for example for parts of the dashboard of motor vehicles which, if foam-backed, will not absorb water via its surface in order to suppress or, respectively, prevent any expansion and shrinkage effects. The leather that is utilized in that manner will of course endure long periods of climate change tests and survive heat illumination, thereby meeting in particular the requirements of the vehicle industry for all kinds of vehicles.

Moreover, the objectives of the new leather in accordance with the invention include its use in Group 1 and 2 safety shoes. In order to achieve a previously not existing water vapor permeability, the leathers may be provided with mechanical perforations which will be explained later in detail.

The following must be stated in detail with regard to the difference between genuine nubuck leather and the new coating:

In the case of genuine nubuck leather, i.e. leather in which the grain surface has been roughened through grinding, most often with abrasive paper with a grain size of between 180 and 450, it will be necessary to re-dye or dye the leathers again following the grinding—in each case depending on the color—because during the grinding, the color-intensive upper grain layer changes greatly due to a lightening effect.

Dark colored nubuck leathers, such as in particular black ones, must always be dyed again following the grinding which is cumbersome, energy-consuming and costly.

In an ascertainment of the degree of gloss measured in accordance with DIN 67530 at a light incidence angle of 60°, the new coated leather which does not require redyeing showed the same or, respectively, better results than the genuine nubuck leathers, with the smooth, preferably glossy surface of the indentations being recognizable in the case of the new leather in its preferred embodiment under direct light incidence and corresponding enlargement.

Results of the measurement of the degree of gloss: genuine nubuck leather, black: result 0.1 to 0.4; leather in accordance with the invention, black, result: 0.1 to 0.4.

The leathers equipped with the novel nubuck-like surface coating meet all requirements or, respectively, parameters of the vehicle and safety shoe industries. They are permanently flexure-proof, soft and at the same time extremely abrasion resistant. Tested in accordance with DIN EN ISO 14327 using the abrasion wheel H22, the surface, for example after 30,000 cycles, did not show any damage yet.

In the case of nubuck leathers, on the other hand, damages are visible after only 1,000 cycles. These findings were also confirmed by a test in accordance with DIN EN ISO 12947-1 after 50,000 cycles in a dry state, in contrast with nubuck leather which showed changes after only 1,000 cycles.

Even in a wet state, no damages to the surface were observed after 12,000 to 15,000 cycles.

In another test on the basis of DIN EN ISO 12947-1 to determine the abrasion resistance under the influence of increased temperature, 80° C. to be specific, no damage could be discerned after 10,000 cycles and the test was therefore discontinued thereafter.

Adhesion following storage in water for 24 h in accordance with ISO 11644 is easily met at 10 N. Here, the value lies approximately three times higher than in the case of traditional automobile leathers. Since no water can penetrate the leather because of the coated surface, it is also perfectly suited for motorcycle saddles as well as for horseback riding and bicycle saddles.

The coating in accordance with the invention will not change its properties in the alternating climate test either; in a sense, the coating acts as a seal and prevents moisture from gaining access to the leather which, if it had access, would negatively impact the stretching and shrinking properties of the leather.

The new coated leathers, preferably split leathers, are optimally suited for foam-backed components and for parts that come into contact with the human skin, such as, in particular, steering wheels, center consoles, gearshift knobs, armrests and the like, but also for boat fittings, hospital and sanitary equipment and the like, as well as for garments, shoes and gloves and, above all, for safety footgear.

Although the thickness of the novel complete coating of the new leather is low at maximally 0.15 mm, it not only has outstanding mechanical and physical properties but it is moreover very soft, cuddly and friendly to the touch and virtually immune to any kind of soiling.

As already mentioned before, the new surface or, respectively, exterior layer may have any surface structure, in particular a stamped one.

May it be separately emphasized at this point that the leather in accordance with the invention, in particular split leather, can be optimally used not only for automobile but also for truck as well as bus seat covers, especially in combination with textiles, and, furthermore, in particular for safety, occupational and athletic shoes, for motorcycle, bicycle and horseback riding saddles and the like.

A particularly preferred embodiment within the framework of the invention at hand which assures a particularly good, virtually inseparable bonding of the exterior layer to the glue or, respectively, adhesive layer responsible for the bonding with the leather is disclosed in Claim 2.

Before going into the advantages of this variation of the nubuck-like leather, let us take a brief look at the state of the art in this sector:

For example, DE 3720776 A describes a leather in which the coating consists of three layers, with a compensatory layer being provided as an intermediate layer and connecting layer. At higher temperatures, the leathers described there display poor adhesive properties of the coating relative to the leather. Also, they do not meet the haptic and grip properties that are demanded in particular for the automobile industry. In addition, it calls for the use of nitrocellulose in the exterior layer which will lead to discolorations in combination with polyurethane foams.

The exterior layer provided there does not contain any silicon additives and has no capillaries or other pores or, respectively, openings.

U.S. Pat. No. 6,177,198 B1 describes a shagreen in which the coating consists of three layers. The exterior layer provided there is equipped with pores that are only partially lined by the thin intermediate layer. The intermediate layer and the connecting layer together have a strength or, respectively, thickness of less than 0.03 mm. The exterior layer contains only approximately 1% of a silicon additive. The intermediate and connecting layers provided there are unsuitable for split leather and are incapable of actually sealing the aforementioned capillaries and indentations in the exterior layer. Moreover, according to said U.S. Pat. No. 6,177,198 B1, these leathers absorb water via their surface which is absolutely unfavorable.

U.S. Pat. No. 4,751,116 A describes a split leather whose exterior layer is formed on a structured silicon base. However, the coating described there is thick, does by no means possess the properties demanded by the automotive industry and contains no silicon additive and, in particular, no indentations, capillaries or the like in its exterior layer.

An essential aspect of the invention at hand lies in the fact that the exterior layer is formed in a manner that is known per se on a warm silicon or, respectively, polysiloxane basis or, respectively, matrix with pins, pegs, elevations protruding upward from the base surface—corresponding to the pores, tubes, ducts and the like—and that the surface of the exterior layer, in addition to the respective surface structure, has also received a certain degree of a matte finish which is permanent and which does not change even under great wear and tear during friction under pressure.

In contrast with previous methods for the preparation of a matrix, the latter is purposely not cross-linked through the use of tin or, respectively, tinorganic compounds, thereby absolutely preventing a migration of tin into the finishing layer and therefore preventing any skin problems on the part of the user caused or, respectively, causable by tin or, respectively, traces of tin.

It is particularly preferred to use a matrix in which the cross-linking was done with platinum as a cross-linking catalyst.

Preferably, the exterior layer contains between 2.5 and 20 percent by weight relative to the total weight of the exterior layer, preferably between 6 and 12 percent by weight of polysiloxane.

It is advantageous if the polysiloxane is imbedded in the form of extremely small solid particles or, respectively, solid microparticles in the exterior layer that is made predominantly of polyurethane. In addition to these solid miniparticles that preferably possess properties like a very soft silicon caoutchouc, higher-molecular silicones may be contained as well that are added via a dispersion or emulsion.

The term small solid particles made of polysiloxane also includes particles made of polysiloxane resin that have been inserted into the exterior layer.

Preferably, the main components of the exterior layer consist of a medium hard ramified polyurethane that is formed by an ultimately solidified dispersion.

The completely filled hollow spaces and capillaries, or better put: the filling form filling materials connected or, respectively, anchored to them by way of their walls are, together with the intermediate layer stratum, single-piece components of the intermediate layer stratum of the adhesive layer.

It is advantageous if the intermediate layer stratum itself is also made of an ultimately solidified polyurethane dispersion that is known per se and that had thermoplastic properties prior to the cross-linking.

In contrast with the exterior layer which advantageously has a partially ramified structure even prior to the cross-linking, the intermediate layer stratum advantageously has—in a way—an un-ramified or, respectively, linear structure and possesses excellent adhesive properties. Its mechanical properties are considerably improved by a subsequent cross-linking and the thermoplastic properties that existed before are nullified.

In accordance with the invention it is provided and essential that the material of the intermediate layer stratum completely penetrates and fills the capillaries, openings, hollow spaces, pores, hollow tubes or the like originally present in the exterior layer and attaches or, respectively, anchors itself to their walls, with the additional mechanical anchoring achieving a particularly strong adhesion of the two aforementioned layers or, respectively, strata to each other.

Particularly good adhesion is achieved if the exterior layer is equipped with between 20 and 3, in particular between 18 and 5, capillaries, tubes, pores or the like or rear-side indentations or the like per $cm^2$ towards the intermediate layer stratum that is connected with it and preferably formed as a homogeneous adhesive layer.

It is advantageous if the intermediate layer stratum and the connecting layer stratum together have a greater layer thickness than the exterior layer.

Both preferably have an almost identical structure that, however, is purposefully different from the chemical structure of the exterior layer.

It is by no means undesirable if any material of the contiguous waterproof connecting layer stratum also protrudes into the hollow spaces, openings, recesses, pores, ducts, tubes or the like of the exterior layer.

The exterior layer with its relatively high silicon contents in accordance with the invention possesses the desired soft haptics as well as a high degree of abrasion and color abrasion resistance due to its high share of polysiloxanes.

In spite of the great silicon contents in the exterior layer which, as is well known per se, has a separating effect, an inseparable bonding of the layers and layer strata of the coating is created due to the fact that the intermediate layer stratum and, if necessary, the connecting layer stratum penetrate into the capillaries and openings of the exterior layer and anchor themselves there as disclosed in Claim 3.

This—in a way—additional "riveting effect" creates an actually inseparable bonding of the layers and layer strata with each other, and this, as has been shown, essentially happens independently of the type and amount of the silicon contents in the exterior layer.

This inseparable bonding will remain fully intact even under the influence of moisture and wetness.

The connecting layer stratum of the adhesive layer formed with the solidified polyurethane dispersion assures that the entire coating is firmly attached to the ground (known) and/or milled and/or studded split leather. The—in a way—interwoven or, respectively, convoluted structure of the coating not only achieves an inseparable adhesion of the layers and layer strata to each other, but moreover, all pores, capillaries, openings or the like of the exterior layer itself are fully sealed in water-proof fashion.

Although the overall thickness of the coating amounts to maximally 0.15 mm, better even thinner than 0.15 mm and preferably less than 0.12 mm, it is water-repellent or, respectively, waterproof from its upper side. Water will roll off or, respectively, will not penetrate into the leather.

It is advantageous if the thickness of the exterior layer amounts to between 30 and 45% and that of the intermediate layer stratum and the connecting layer stratum together to between 70 and 55% of the overall structure of the new coating.

The coated split leathers in accordance with the invention meet all parameters of the vehicle industry. They are permanently bending resistant, soft and extremely abrasion resistant. Their abrasion resistance is approximately ten times as great as in the case of conventional grain leathers for vehicles.

Adhesiveness following storage in water for 24 hours in accordance with ISO 11644 is easily met at 10 N. Here, the value is three times as great as in the case of conventional automobile leathers.

The coating in accordance with the invention will not change its properties even during the alternating climate test; the coating—in a way—acts as a seal and prevents the influx of moisture from outside which, if it had access, would negatively impact the stretching and shrinking properties of the leather.

The coated split leathers are optimally suited for foam-backed components and parts that come in contact with the human skin, such as, for example, steering whets, median consoles, gearshift knobs, armrests and the like, also for boat fittings, hospital and medical equipment, etc.

Moreover, they are particularly suited for work shoes that need to be worn in a wet environment and for winter outdoor shoes which will no longer show any salt borders.

Neither the intermediate nor the connecting layer contains any silicones. Although the overall coating of the new leathers is thinner than 0.15 mm, it not only possesses outstanding mechanical and physical properties, but due to the high silicone contents of its exterior layer it is very soft and grip-friendly and practically immune to watery soiling. This is particularly important in the case of nubuck-like surfaces.

The haptic properties may even be improved if the intermediate layer stratum and/or the connecting layer stratum contains or contain micro hollow spheres that are known per se, with a volume share of less than 10%.

The leathers in accordance with the invention will be soft if, prior to being coated, they are not only ground in known fashion but are also subjected to a milling and/or studding process that may be provided in accordance with the invention. This will further improve adhesion because grinding dust and loose fibers will be removed from the leather surface or, respectively, will be at least reduced.

Although the exterior layer accounts for maximally, in particular less than 45% of the overall thickness of the thin overall overlay, it may have any arbitrary surface structure.

In accordance with the invention or, respectively, with its preferred embodiments, the exterior layer has the looks and the pleasant feel of a nubuck leather. In accordance with the invention, this is brought about by the fact that the silicon matrix for the exterior surface of the exterior layer has a nubuck-like rough surface in the negative, with elevations and indentations in the range between 0.0005 and 0.008 mm, which is also a consequence of the high silicon contents in the exterior layer.

During the grinding of a foamed synthetic material with a preferably round cell structure, round cells will be opened more or less widely, and opened cells are created on the synthetic material. This structure will be transferred to the surface of the exterior layer via a warm silicon matrix.

In addition, this surface—having the visual appearance of nubuck leather—may also have an embossed structure.

Such a surface will also fully meet the requirements of the vehicle and shoe industries. Due to the fact that the "open cells" acting similar to the nubuck effect are arranged only on the surface of the exterior layer, the layer will not absorb water and will of course not permit water to penetrate.

In accordance with the invention it may moreover be provided that the exterior layer has a coating of less than 0.005 mm thickness made of a silicon caoutchouc formed from an aqueous silicon emulsion with a particle size in the nanometer range. This will further improve the avoidance of watery soiling as well as the creaking behavior. Last but not least, this extremely thin layer will also improve the fire retarding behavior of the new coated leather.

The split leather in accordance with the invention may be optimally used in accordance with Claim 2 and Claim 3 for truck seat covers as well as for bus seat covers, above all in combination with textiles.

The various embodiments and variations described above of the split leathers in accordance with the invention or, respectively, obtained in accordance with the invention as well as in particular of their coatings and their designs in particular with regard to the mutual riveting of the layers and layer strata form the subjects of Claims 4 through 7.

Claims 8 through 19 will provide detailed information with regard to the various advantageous embodiments of the surface and the material of the exterior layer of the new coated leathers.

As far as the adhesive layer is concerned, or, respectively, the layer strata forming the latter, reference is made to Claims 20 and 21.

Another essential objective of the invention is a further improvement of the essential new properties of the leather in accordance with the invention by means of applying a finishing layer on its exterior layer. Until now, this finishing layer has in most cases been based on a polymer or, respectively, polyurethane layer and is formed from aqueous polyurethane dispersions for environmental reasons. This finish is relatively thick, as a rule even more than 0.01 mm. Such polyurethane finishing layers are usually hard and possess no good hydrolysis properties.

In order to improve the haptic and the color abrasion and abrasion properties especially of vehicle and shoe leather, the finishing layers applied on the exterior of the exterior layers contain leather silicon emulsions and/or dispersions or, respectively, are structured with the latter. These silicon emulsions are prepared, for example, from low to medium molecular oils with the use of emulsifying agents. Over time, the emulsifiers and the oils migrate to the surface and are abraded during their use.

It has moreover been known to impregnate absorbent materials such as, for example, fabrics or leather, with silicon emulsions.

One disadvantage of the conventional finishing layers containing polyurethane lies in the fact that, due to their relative great thickness of approximately 0.01 mm, they seal the pores that are present in the underlying layers, which leads to a reduction of a previously existing air and water vapor permeability. In their fresh state, i.e. as long as the silicon emulsions are still present as such, these finishing layers are also mildly hydrophobic. In the case of perforated leather, watery liquids will penetrate unhindered into the leather through the entire overlay where they will lead to the growth of fungi and bad odors. Water-based products such as, for example, coffee, red wine or ketchup leave behind irremovable soiling, particularly if and when the silicon emulsion has completely or partially disappeared.

Therefore, an additional objective of the invention at hand is to create a natural leather with a coating or, respectively, an overlay whose externally located finishing layer does not have those disadvantages, i.e. that is hydrolysis-proof, protecting the underlying exterior layer formed of a dispersion containing a solidified polyurethane. In addition, the finishing layer is intended to be thin so that it won't seal any existing or installed pores.

It should moreover be soft and lead to good haptics; it should not contain any emulsifiers because they will negatively impact its wetness properties; it should also be lightproof, scratch and abrasion resistant, permanently water-repellent, transparent to color-transparent, free of VOC, heat resistant and dirt-repellent.

In addition, the finishing layer should not be polishable, and the products equipped with it such as, for example, car seats, steering wheels, furniture covers or shoes are not supposed to lose their degree of luster over time.

Another objective of the invention is to make sure that end-to-end perforations in the leather and, if applicable, capillaries and/or pores provided in the overlay or, respectively, in the coating for better water vapor and air permeability are or, respectively, remain open and that furthermore there is the possibility of eliminating the wicking action of sewing threads or, respectively, to prevent a water transport, for example in the case of shoes, from the exterior to the interior which is still a great problem for example in the case of so-called semi-aniline leather.

Finally, the applied finishing layer should protect the underlying exterior layer formed with polyurethane, and thus also the leather surface, mechanically, physically or, respectively, chemically.

In the case of a leather of the kind mentioned at the beginning, these objectives are met by means of the features listed in the characteristics of Claim 22.

In accordance with the invention, it is therefore provided that an emulsifier-free, extremely fine-particled, nearly limpid, transparent aqueous silicon emulsion with particle sizes in the nano-range and with a solid contents of less than 5%, preferably of less than 2%, and a viscosity similar to that of water is applied on the polyurethane layer and firmly bonded with it. A hydrophobic finishing layer is formed on the polyurethane exterior layer that in its solidified state is thinner than 0.009 mm, preferably thinner than 0.007 mm.

It is advantageous if the finishing layer is colorlessly transparent and penetrates into capillaries, hair pores as well as into perforations and pores in the polyurethane coating of the leather, in particular into their opening area located on the outside, and prevents, even in the case of perforated leather, under static conditions a drop of water from soaking through the perforation etc. into the leather even if the perforations or the like have a diameter of 0.5 mm. The surface tension of water on this finishing layer is so great that a drop will stand still on the hydrophobic surface, unable to penetrate into a perforation or, respectively, into a capillary.

Any pre-existing air and water vapor permeability of the natural leather will not or, in any event, not appreciably be altered by the applied finishing layer. The finishing layer is so thin that, for example, 1 $m^2$ of leather together with the finishing layer will weigh only 4 grams more than the leather without the layer.

It has been determined that the hydrolysis behavior of the polyurethane layer is essentially improved by the application of the described finishing layer because the latter is hydrolysis-resistant and impedes the access of water to the exterior layer which is of particular importance especially for vehicle seats in a humid and warm climate.

Moreover, it came as a surprise when it was determined that the leather in accordance with the invention and equipped with the silicon finishing layer is not only water-repellent but also possesses excellent properties with regard to its creaking behavior.

If a water-resistant polyurethane exterior layer without silicon finishing layer as described so far comes into contact with water, it will be moistened and the water will remain on it without penetrating it, but if there is a finishing layer, the water will roll off of it.

Ultimately, the penetration of water, of watery dirt and other water-containing liquids such as, for example milk, red wine, for example into perforated leather car seats will be prevented or, respectively, permanently impeded by the finishing layer. Rain showers will not leave any damages behind on the seats of a convertible, in particular because the wicking action of the sewing threads in the area of the stitching can be eliminated by means of the material of the finishing layer.

The finishing layer which advantageously has a density of less than 1 provides the leathers with particularly pleasant haptics and a "silken" grip which will not change its properties even after long-term use. The thin transparent "silk gloss" finishing layer reflects the depth of the color of the underlying pigmented polyurethane exterior layer well.

The leather in accordance with the invention and equipped with the finishing layer exhibits particularly good permanent flexural behavior. Especially at low temperatures it is far superior to leather with conventional overlays. For example, 50,000 flexions are attained at temperatures of −20° C., while in the case of conventional leathers, the surface will show damages after only 5,000 flexions.

Silicon emulsions in the polyurethane exterior layer that usually tend to emigrate and to impede the bonding process due to their separation effect, in this case even act positively because there exists an affinity to the silicon nanoparticles which leads to a good bonding between the solidified aqueous dispersion exterior layer containing polyurethane and the finishing layer. The finishing layer even prevents to the largest extent the emigration of the oily components of a silicon emulsion present in the polyurethane coating or, respectively, in its exterior layer.

More detailed facts concerning the embodiments of the leather in accordance with the invention equipped with the new finishing layer can be gleaned from Claims 23 through 32.

Claims 33 through 38 relate to more detailed aspects of the adhesive layer or, respectively, of its intermediate layer stratum and the connecting layer stratum of the leather in accordance with the invention.

Claims 39 through 42 deal with the pore channels and perforations in the various embodiments described so far that are present, for example, due to the manufacturing process and realized in particular in their coatings.

If for certain applications, in particular in the shoe or vehicle sector, a certain additional water vapor permeability is demanded of the new leather, the coating of the leather can be perforated mechanically or physically in accordance with the invention, preferably in such a way that only the coating is perforated in its overall thickness—i.e. end-to-end through the coating—and the perforations penetrate the leather only partially from the upper side or, respectively, from the surface of the exterior layer, for example up to approximately 50% or 60%.

Perforating is to be understood as for example the piercing with dull needles with a diameter of less than 0.3 and 1.6 mm.

To this end, preferably between 4 and, for example, 72 fine channels are arranged per cm$^2$. Following the perforation, thin coating occurs with the silicon nanoparticle dispersion forming the finishing layer in a thickness as disclosed, however in such a way that the walls of the perforations will be coated as well without the perforations being clogged in the process, thus being permeable to water vapor towards the exterior.*

In accordance with the invention, the mechanical or physical perforation may be done on the entire split leather piece or on a component, for example of a shoe or of a saddle. In accordance with the invention, the thin silicon nanoparticle coating may also be applied on the finished shoe or the finished part of a vehicle seat.

The following supplementary facts must be pointed out at this time:

Especially in the case of the nubuck-like coating, very few and very fine capillaries are created due to manufacturing conditions that penetrate the entire coating. But these capillaries are so small or, respectively, so narrow, to wit: on average less than 0.03 mm, that they can not be perceived visually and in the ratio to the semispherical indentations on the exterior side that are closed toward the interior, amounts to the surface portion in these closed semispherical indentations between 1 and maximally 10% [the latter part of this sentence is completely nonsensical in the German original].

For certain applications, such as, for example, for Group 2 safety shoes, it may be possible that the intended water vapor pressure fluid and the required water vapor value will not be attained in spite of that.*

In this case, the coating may be additionally perforated mechanically. The silicon nano-coating not only improves the soiling behavior but in this case also prevents water from penetrating from the outside to the leather or, respectively, into it.

It was found, see Claim 43, that by adding fine-particled ceramic powder with a particle size of maximally 60 μm, in particular in an amount between 0.3 and 10 percent by weight—in each case relative to the overall coating—the temperature will be dissipated faster to the chromium-tanned substrate (split) leather. Other inorganic powders such as, for example, quartz powders may also be used in lieu of ceramic powders. This is very advantageous for safety shoes that are worn in a warm environment.

In the case of safety shoes for use in industry and commerce where sharp or, respectively, sharp-edged objects must be manipulated and where cut resistance is important, in particular in the field of glass manufacturing and processing, leathers in accordance with the invention and with its Claim 44 have proved their value, having a fabric or weave made of a highly resistant yarn material in particular on the basis of polyaramide fibers or, respectively, filaments with a weight per unit area of 40 to 85 g/m$^2$ arranged between the polyurethane exterior layer equipped with micro-indentations and the substrate leather, i.e. for example in the adhesive layer. In principle, the overall coating minus the fabric insertion should amount to maximally 0.15 mm. In the case of an imbedding of a fabric or weave, in particular one made of polyaramide fibers, the coating will be increased by the thickness of the fabric or weave, thereby increasing the thickness of the overall coating to at least 0.30 mm.

For a determination of the overall coating thickness, the polymer coating is cleaned separately from the leather of any leather fibers and measured with a thickness meter at a contact pressure of 1,000 g per 1 cm$^2$. Without the weave insert, the thickness amounts to between 0.09 and 0.15 mm.

If in the case of safety shoes the backside of the leather is also impregnated with the silicon nano-dispersion as provided in Claim 45, water penetrating to the leather for example through a damaged coating will not be able to spread on the backside of the leather, and this layer close to the skin of the wearer will remain dry and comfortable.

But the thin monolayer on the surface and the nano-impregnation on the backside of the leather have practically no impact on the water vapor permeability. Thus, the leathers are and remain waterproof from the outside but they allow water vapor to penetrate from the inside.

The backside impregnation with the nano-silicon dispersion or, respectively, emulsion not only prevents or, respectively, not only reduces water absorption from the backside of the leather; it also has a positive effect on the fire behavior of the leathers in accordance with the invention. In particular when this thin nano-layer is present on the upper side of the overlay and on the backside of the leather and as impregnation that has penetrated into the leather by approximately 0.2 mm.*

The leather will not burn even in the most stringent fire tests or extinguish within the shortest period of time. These leathers even meet the stringent tests with regard to fire behavior of the aircraft industry.

Claim 48 relates to a safety shoe that is made at least partially with the leather in accordance with the invention.

Moreover, the methods for the manufacture of the new leathers constitute essential subjects of the invention, with Claims 47 and 48 concerning in particular the formation of the nubuck-like surface of the leather coating or, respectively, of its exterior layer, while Claims 49 through 61 relate to various preferred embodiments of the finishing layer formed with silicon nanoparticles.

Finally, the use of the silicon nanoparticle emulsion in accordance with claim 66 and the typical products made of the new leather in accordance with Claim 67 are also important subjects of the invention.

The invention will be explained by way of the drawing:

BRIEF DESCRIPTION OF THE SEVERAL VIEWS OF THE DRAWING

FIGS. 3 and 4 show REM images of the surfaces of this leather in different enlargements.

FIG. 1 shows how a coating 5 with—in this case—a single-stratum adhesive layer 3, for example on a polyurethane basis, is two-dimensionally bonded to the—for example—ground surface 20 of the split leather 2 forming the substrate to which coating or, respectively, its surface 30 the novel exterior layer 4 with nubuck character is two-dimensionally bonded.

Figure 1:
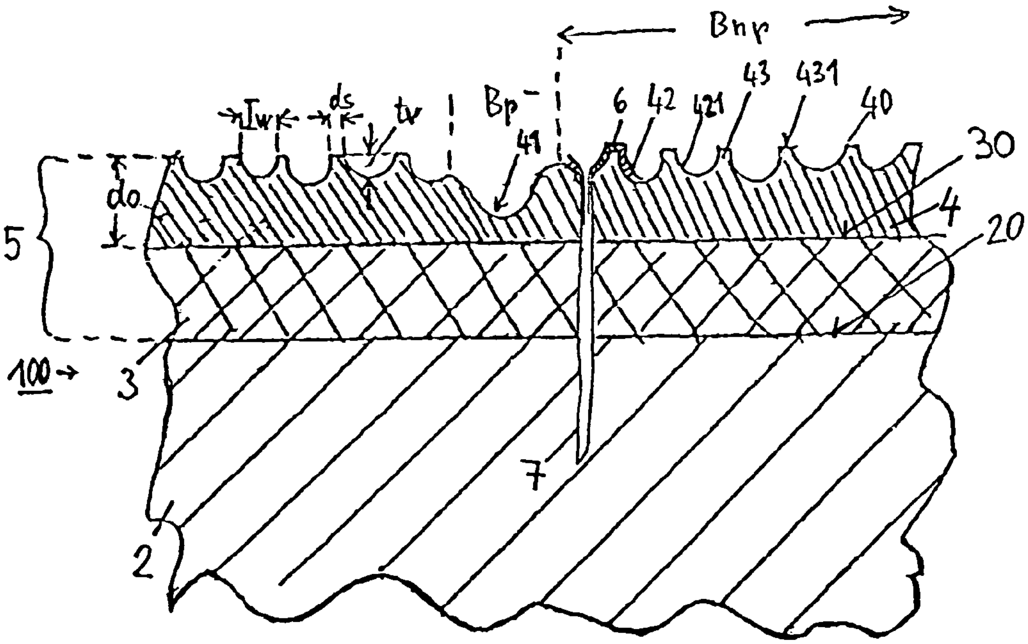
FIG. 1 shows the view of a cut through the new leather as it corresponds in principle to Claim 1.

The aforementioned exterior layer 4 having a thickness do has in the areas Bnp on its surface not provided with embossing 41 a multitude of closely arranged, sunken, approximately semispherical-like concave micro-indentations 42 that are open towards the surface, with interior widths Iw preferably within the range of 20 to 80 μm.*

The interior surfaces 421 of the spherical shell-like or, respectively, calotte-like micro-indentations 42 are at least microscopically smooth and have therefore a great light reflection capability, i.e. they shine, something that is however not visible to the naked eye but perfectly visible when viewed through a microscope.

On the other hand, the surfaces 431 of the interlinked bars 43 forming a circular border around the micro-indentations 42 are considerably rougher; they are matte to micro-fibrous, with this surface quality coming, for example, from the ground surfaces of the negatives used to make the micro-indentations 42.

The thickness or, respectively, breadth ds of the bars 43 amounts to a fraction of the interior width Iw of the approximately semispherical-like concave micro-indentations 42. The latter are all closed on the underside towards the adhesive layer 3 and assure in particular the great dirt-repellent capability of the new leather in addition to its complete moisture resistance.

It goes without saying that the depth tv of the micro-indentations 42 is associated with their interior width and amounts to, for example, 5 to 60 μm.

The narrow surfaces 431 of the borders or, respectively, bars 43 are matte to extremely micro-fibrous soft and flexible and impart the typical nubuck grip and the nubuck-like appearance in combination with the dirt-repellent smooth micro indentations 42.

When touching the surface of the new leather 100 formed by the narrow bars 43, one will only feel the soft matte surface quality imparting a perfect nubuck feel, with the micro-indentations 42 not being perceivable as such.

As mentioned before, the micro-indentations 42 have a very smooth homogeneous, i.e. intrinsically glossy light-reflecting concave surface 421 which is well visible under a light microscope at, for example, fifty-fold magnification. The aforementioned micro indentations 42 or, respectively, their surfaces 421 are smooth, homogeneous and liquid-proof towards all sides.

The novel surface that is often better looking than nubuck leather and which has the same feel consists in all of its parts of a single piece of a soft cross-linked polyurethane.

In any event, the polyurethane has a hardness of less than 75 Shore A. The exterior layer 4 may of course also contain pigments and other additives that per se are common in finishing layers, such as in particular gripping agents, lubricants or the like. The dirt-repellent effect is further improved in that the exterior layer 4 contains silicon particles that are known per se and that are added to the polyurethane dispersion as silicon dispersion or silicon emulsion for its hardening.

The Shore hardness is determined following the hardening of the polyurethane dispersion mixture to a foil with a thickness of 5 mm.

The novel nubuck-like or, respectively, similar upper layer or, respectively exterior layer is preferably formed by means of water evaporation from a polyurethane dispersion applied on a negative base made of silicon caoutchouc having a multitude of positive spherical calottes on the surface.

FIG. 1 furthermore shows that, for example for leather for safety shoes, perforations 7 may be added to the coating 5 that reach all the way into the leather 2. In this case it is advantageous if a silicon finishing layer 6 is applied on the exterior layer 4 which will ultimately cover the walls of the perforations 7 and, if necessary, impregnate the leather 2. The start of the perforation 7 is shown in detail in FIG. 2.

From FIG. 1 it can also be seen how the micro indentations 42 are arranged only in the not embossed areas Bpn of the finishing layer 4 and the embossing 41 in the embossed area Bp.

Figure 2:
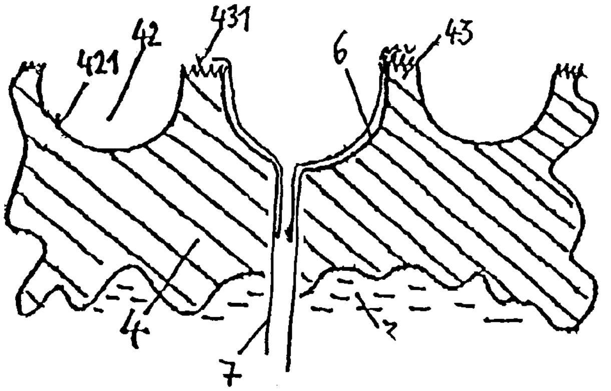
FIG. 2 shows a detailed sectional view of the surface layer of this new leather.

FIG. 2 illustrates—with the reference signs having the same meanings—the afore described conditions in the novel exterior layer 4. There, the difference between the matte to micro-fibrous exterior surface 431 of the bars surrounding the micro-indentations and the light-reflectingly smooth concave interior surface 421 of the approximately semispherical-like micro-indentations 42 is illustrated.

With the reference signs having the same meanings, the two FIGS. 3 and 4 show scanning electron microscope REM images at 50 and 100-fold magnification of the surface 40 of the novel exterior layer 4 of the new coated lather 100 with a large number of—here shown dark-colored—densely arranged micro-indentations 42 with their essentially semi-spherical-like smooth interior surfaces 421 open towards the outside and the—here shown light colored—bars 43 with a rough or, respectively, matte surface 431 in those areas Bpn where no embossing was done.

From FIGS. 3 and 4 it can furthermore be seen that the micro indentations 42 each having fully closed borders are not completely regular, and it should be mentioned that in extreme cases they may have for example a somewhat polyhedral, in particular hexahedral shape or, respectively, cross sectional shape.

FIG. 5 again shows the split leather 2 forming the base whose surface 20 has been freed of its grain layer. This surface 20 connects flush with its two-dimensionally bonded connecting layer stratum 3" of the adhesive layer 3 formed of a solidified dispersion containing predominantly polyurethane and whose upper exterior surface 30" borders an intermediate layer stratum 3' of the adhesive layer 3 that is preferably similarly composed and that is, if need be, bonded to it in partially chemical fashion.

This intermediate layer stratum 3' is connected to the exterior layer 4 containing silicon or, respectively, polysiloxane and having a mound-like structure 41 at its surface 40.

The layers or, respectively, layer strata 3 or, respectively, 3", 3' and 4 just described in detail together form the db thick coating 5 of the leather 100 coated in accordance with the invention, with the combined thickness dvm of the layer strata 3' and 3" being greater than the thickness df of the exterior layer 4.

It is now essential that in the exterior layer 4—made for example on a hot matrix—tubes, ducts, pores, hollow spaces 45 or the like formed there by means of elevations in the matrix and fully reaching end-to-end extend from their lower boundary surface 40' of the exterior layer 4 either to their surface 40, and/or that recesses, "indentations" 45' or the like at least reach into the exterior layer but still end within the exterior layer.*

Form filling materials or, respectively, form protuberances 36' or, respectively, 360 formed with the polymer material of the intermediate layer stratum 3 and made as a single-piece with the same—here shown schematically as approximately cylindrical cones 36'—that always completely fill the aforementioned tubes, ducts 45 or the like as well as the recesses, indentations 45' or the like and that are bonded flush to their lateral walls and which in the case of end-to-end pores 45 or the like reach to the surface 40 of the exterior layer 4 protrude into these initially present tubes, ducts 45 or the like and/or recesses, "indentations" 45' or the like.*

The form filling materials 36', 360 are formed from a polymer dispersion that possessed a high degree of adhesiveness prior to solidifying and that was ultimately hardened in the same manner as the remaining intermediate layer stratum 3', for example through cross-linking to the intermediate layer stratum 3'.*

There are, for example, on average approximately 5 to 10 pores or recesses 45, 45' present for each $cm^2$ of the finishing layer surface 40 that fully and/or not fully penetrate the exterior layer 4.

Figure 5:
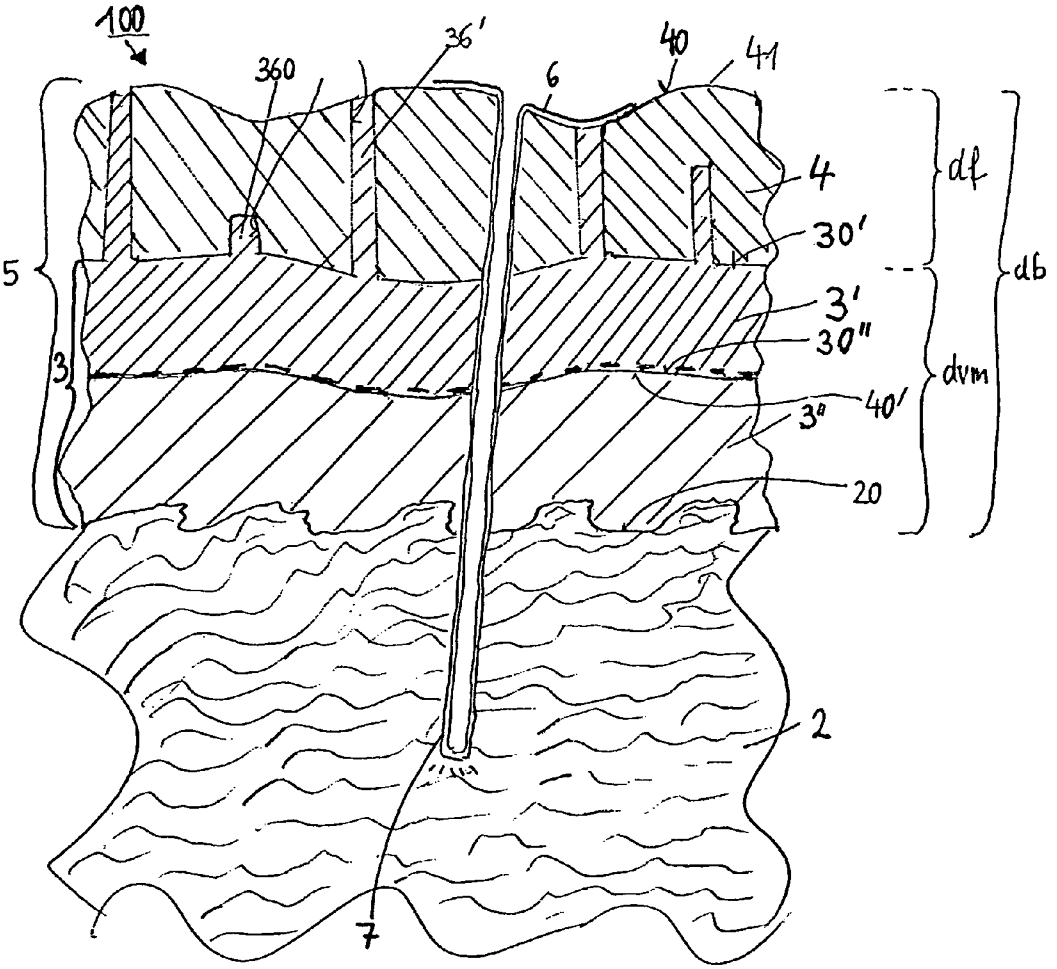
FIGS. 5 through 8 show schematic views of the cross sections through the surface-near area of the new coated leathers or, respectively, split leathers in accordance with the invention.

FIG. 5 also shows schematically one of the hole perforations 7 put into the coating 5 as well as a nano-silicon finishing layer 6 bonded to the exterior layer 40 which also covers the walls of the perforation 7 and which impregnates the leather 2 at its base at least to a minor degree.

Figure 6:
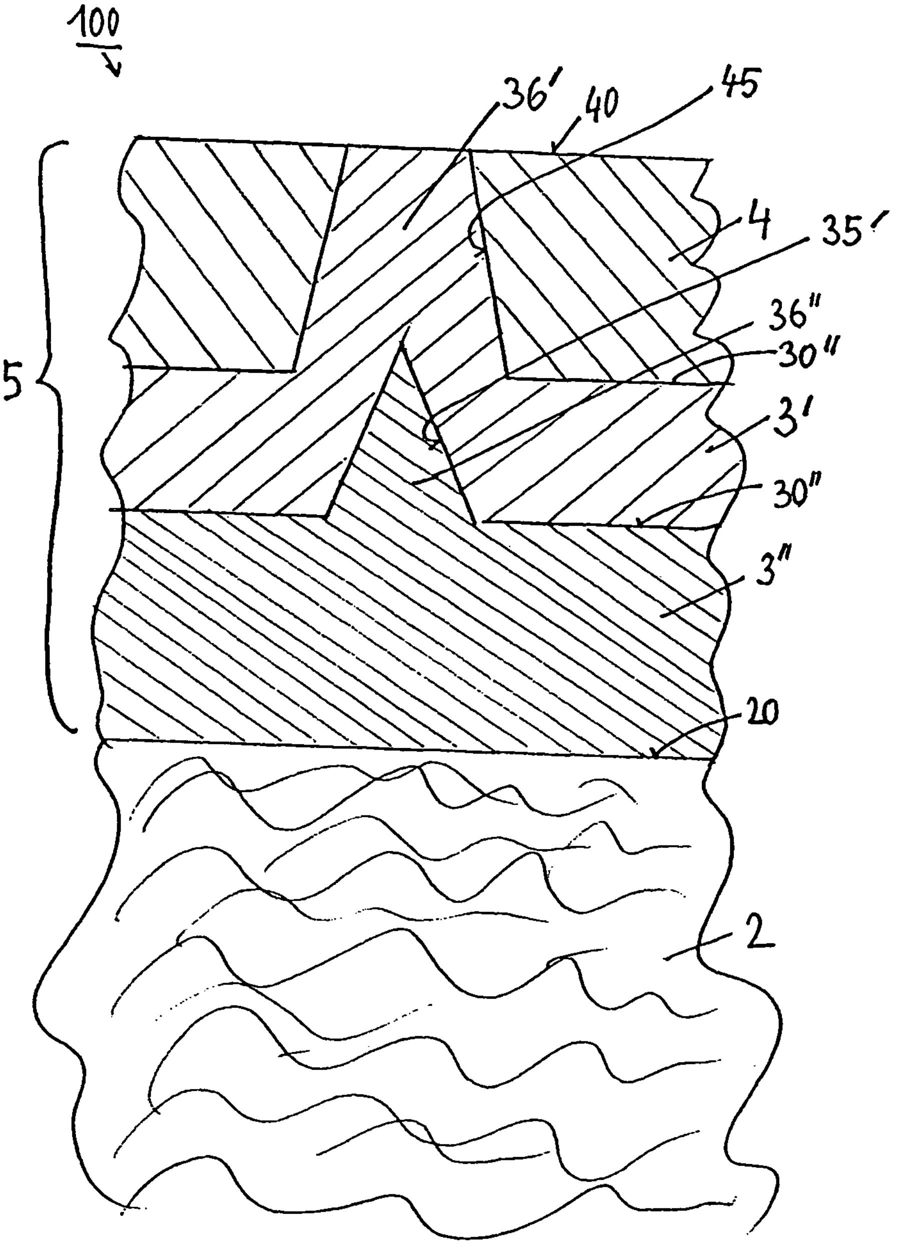

With the reference signs having the same meanings, it can be seen in FIG. 6 that the ducts, tubes 45 or the like shown here and fully extending end-to-end are filled with for example truncated cone-shaped protrusions 36' of the intermediate layer stratum 3' that extend all the way to the exterior surface 40 of the exterior layer 4.

A recess 35' having a truncated cone shape here as well is formed inside of one of these protrusions 36' coming from the intermediate layer stratum 3' which itself is filled with an approximately cone-shaped form filling material 36" that has penetrated it and that is made of the polymer material of the connecting layer stratum 3".

It goes without saying that perforations analogously to FIG. 5 can be installed in this coating 5 as well.

Figure 7:
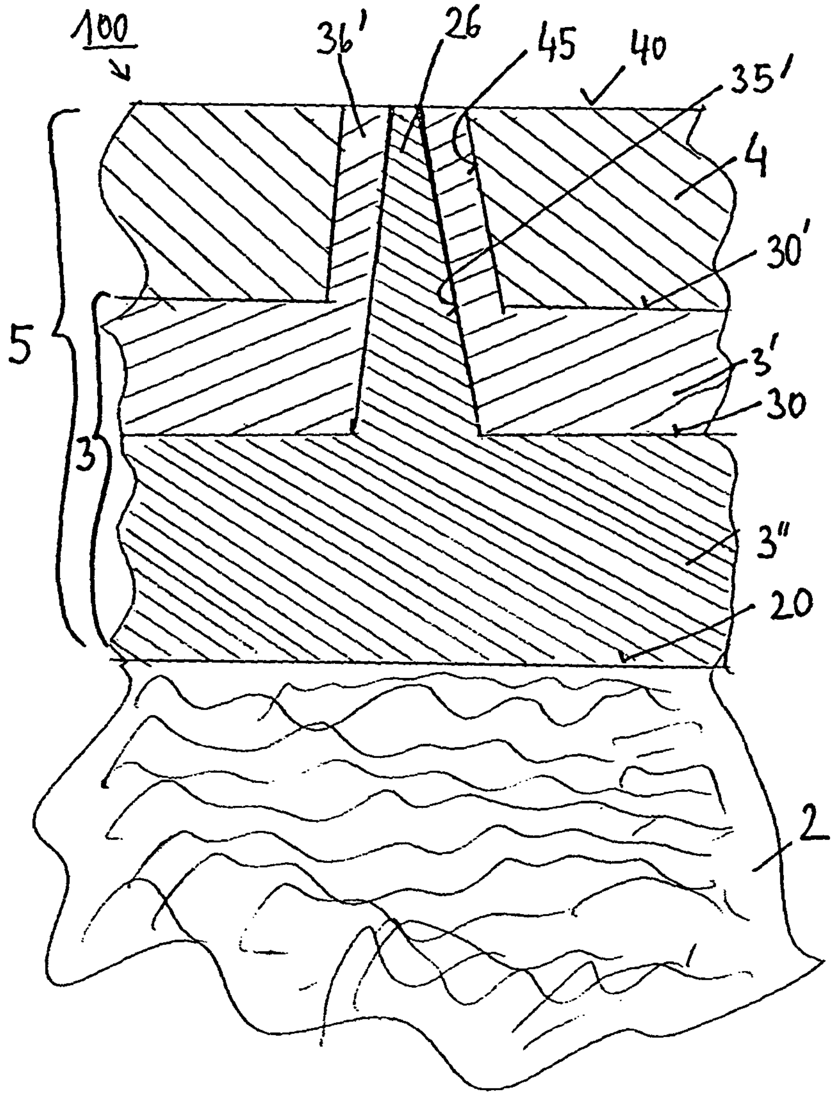

FIG. 7 moreover shows—with the reference signs having the same meaning—another embodiment of the leather 100 in accordance with the invention, with a truncated cone-shaped pore 45 or the like extending all the way to the exterior surface 40 of the exterior layer 4 which is completely filled with an end-to-end peg 36' or the like made of the polymer material of the intermediate layer 3'.

Here, the peg 36' or the like itself also has a pore 35' extending fully to the surface 40 of the exterior layer 4 which in turn is completely filled with an internal peg 36" or the like made of the polymer material of the connecting layer stratum 3" and which also ends at the exterior layer surface 40 (where it is exposed). In the case of this embodiment of the leather coating 5, a particularly strong bonding between the exterior layer 4 and the layer strata 3' and 3" is assured.

Figure 8:
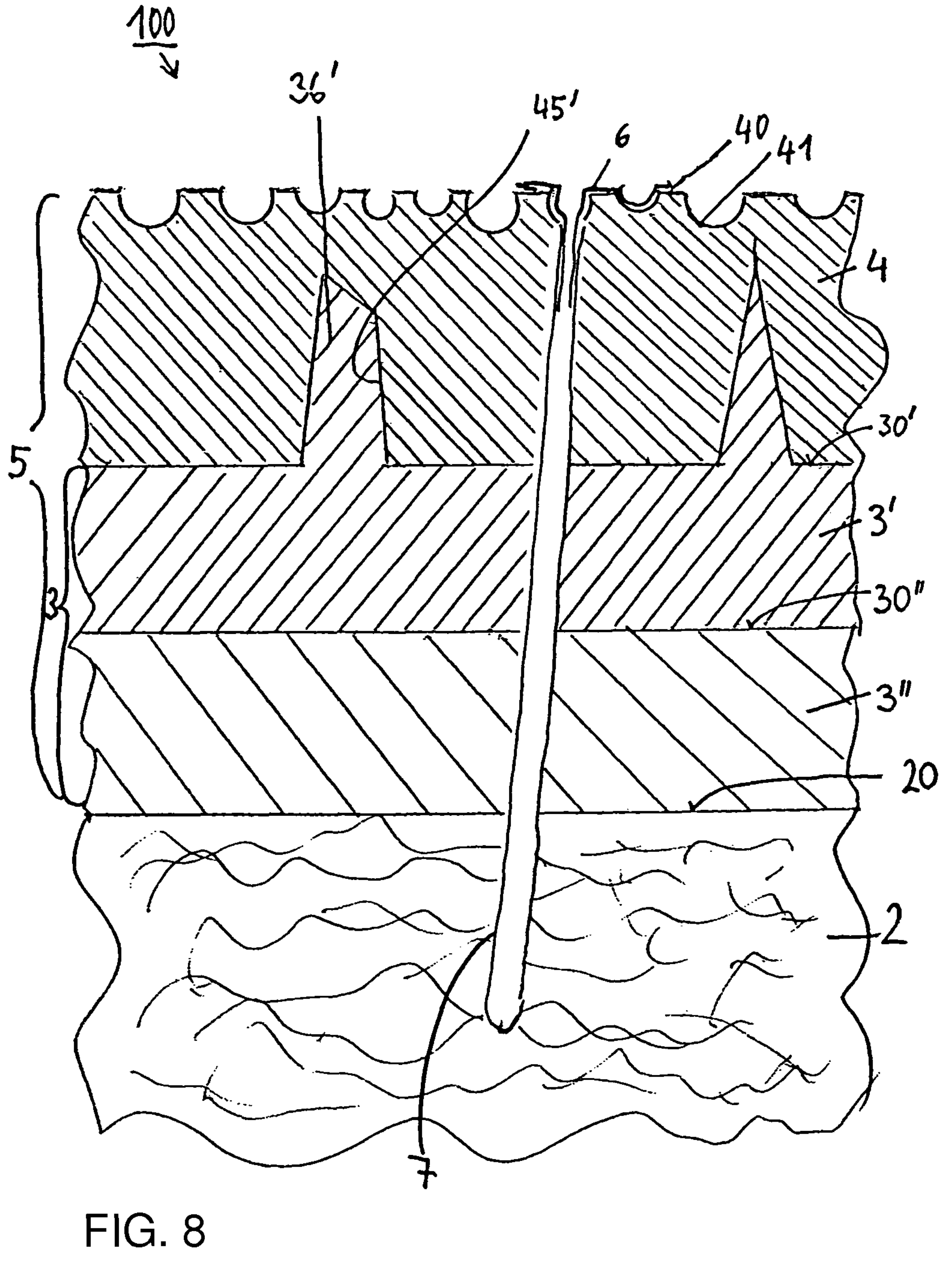

FIG. 8 shows—with the reference signs having the same meaning—a cut through a split leather 100 coated in accordance with the invention, with the anchoring pores 45' or the like in the exterior layer 4 not extending all the way to the exterior surface 40, and consequently the layer anchoring pegs 36' or the like made of the polymer material of the intermediate layer stratum 3' and filling the pores not doing so either.

FIG. 8 shows very well how the exterior surface 40 of the exterior layer 4 is formed with a hollow hemispheric structure 41 by means of the "multisphere" surface, for example of a spherically foamed polymer, and has a nubuck-like appearance.

Figure 9:
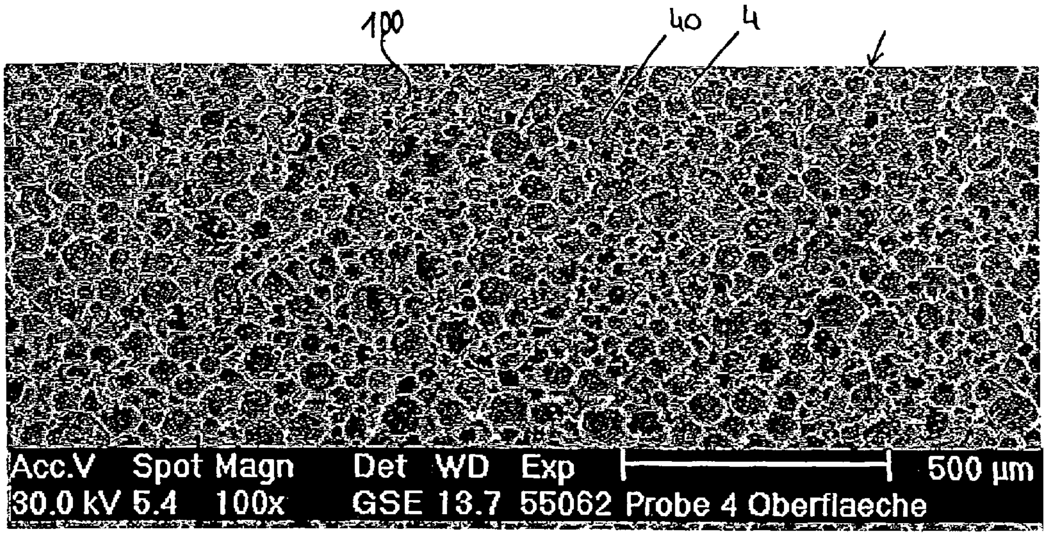
FIGS. 9 and 10 show enlarged images of the exterior surface of the finishing layer whose structure in this case was formed using a foamed polymer.
Figure 10:
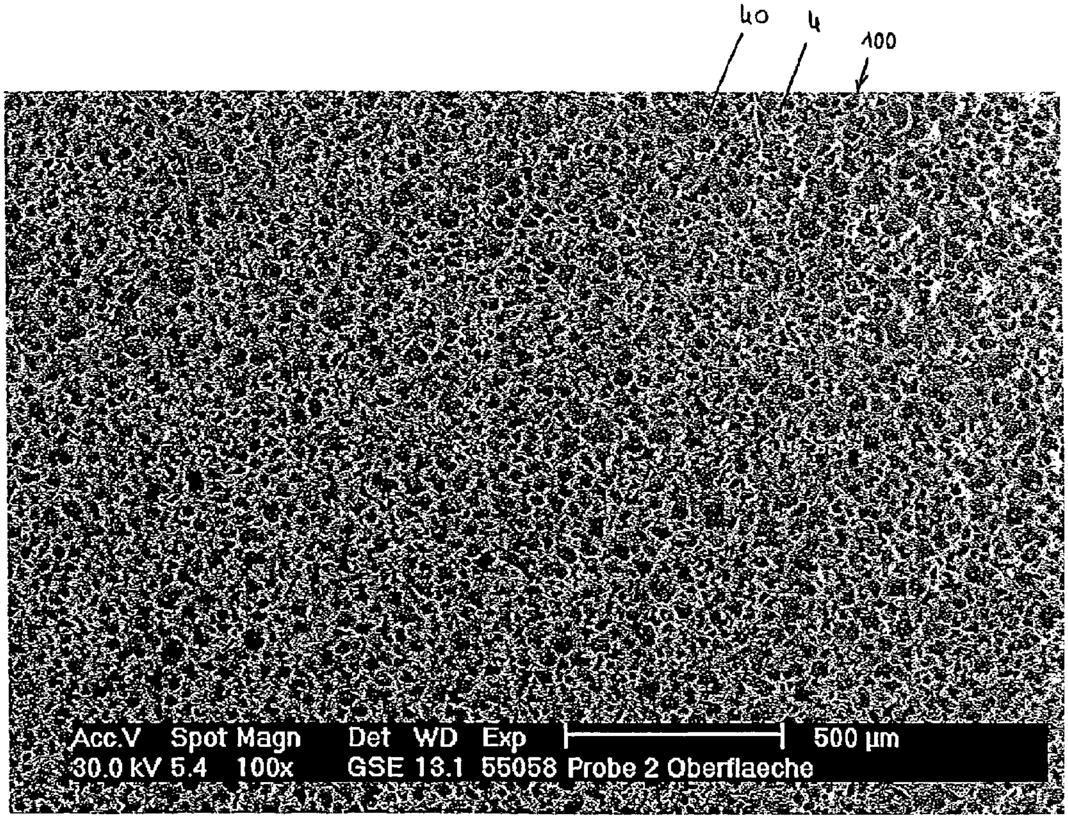

FIGS. 9 and 10 each show—with the reference signs having the same meaning—a top view of the just mentioned exterior surface 40—equipped with may approximately hemispheric indentations—of the exterior layer 4 of the coated split leather 100 shown in FIG. 8.

In all, the finishing layer contains 1.5 to 20 percent by weight polysiloxanes. In the case of grain leather or leather with a technical surface, this portion of polysiloxanes preferably amounts to 4 to 12 percent by weight, in the case of leather with a nubuck-like surface, preferably 10 to 18 percent by weight.

Figure 11:
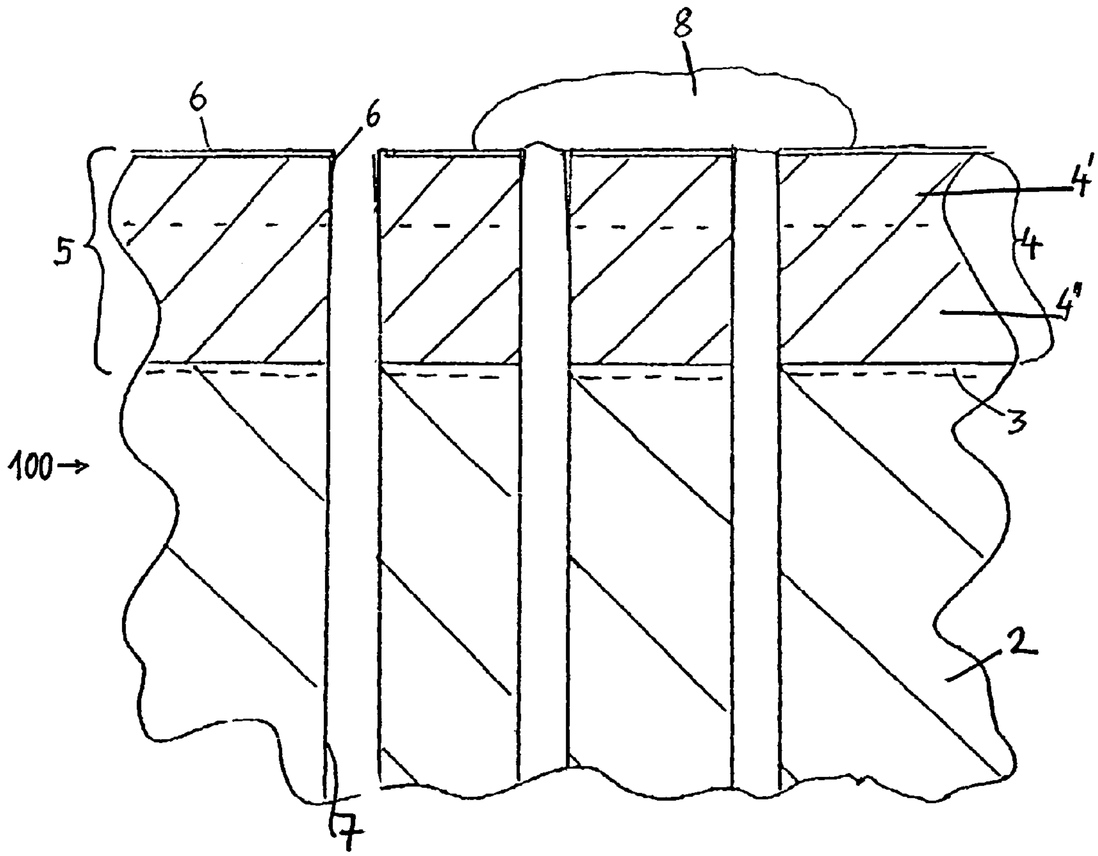
FIG. 11 and FIG. 12 finally show enlarged schematic cuts through the surface structure of a new leather equipped with a finishing layer as mentioned before.

An enlarged cut through a leather 100, i.e. through a natural leather, is shown in FIG. 11 which explains the finishing coating of the leather in detail. Here, an overlay 5 with only one exterior layer 4 that, if need be, is bonded to the leather 2 with an adhesive layer 3 can be applied on the leather body 2 in the form of at least two polymer layer strata 4', 4" formed with aqueous synthetic dispersions, in particular a polyurethane dispersion. It is advantageous if at least two polyurethane layer strata 4, 4" are applied on the leather 2 as overlay or, respectively, coating 5. The interior polyurethane layer(s) 4' may be formed somewhat softer, particularly in order to improve the adhesiveness of the leather 2. The exterior layer (s) 4' on a polyurethane basis located on the outside may be formed somewhat harder. Micro hollow spheres may be arranged or, respectively, contained in at least one of these polymer layers.

A finishing layer applied on the polyurethane layer or, respectively, on the outermost polyurethane layer, i.e. exterior layer 4, is marked 6. This finishing layer 6 is a thin emulsifier-free micro-particled silicon closing-off layer which contains silicon particles in the nanometer range, in particular within the range from 1 to 25 nm, preferably 8 to 16 nm.

The thickness of the finishing layer applied on the exterior layer 4 amounts to approximately 0.0005 to 0.009 mm, preferably 0.003 to 0.007 mm.

In the inner wall area close to the surface of capillaries 7 that are formed in the leather body 2 or, respectively, in the exterior layer and in the adhesive layer 4, 3, a finishing layer 6 is formed as well, and the silicon emulsion also penetrates into the capillaries 7, however without clogging them; instead, a two-dimensional finishing or, respectively, protective layer 6 is formed on the walls of the capillaries at least in their upper or, respectively, exterior end section, as can be seen in FIG. 11.

It has been shown that even under dynamic conditions, a drop of water 8 can not, or only with difficulty, advance to or, respectively, penetrate into the leather 2, to wit due to its surface tension relative to the applied exterior layer 4, the finishing layer 6 and the impregnation of the leather formed at the bottom of the capillaries in FIG. 6 which impedes considerably the spreading and penetration of water into the leather. Since the finishing layer 6 is formed extremely thin in all places, it is able to line the interior surfaces of the perforation openings 5 and thereby protect them. The same goes for pores and capillaries present in the exterior and adhesive layers 4, 3 whose wall surfaces are coated with the silicon emulsion of the finishing layer 6.

Figure 12:
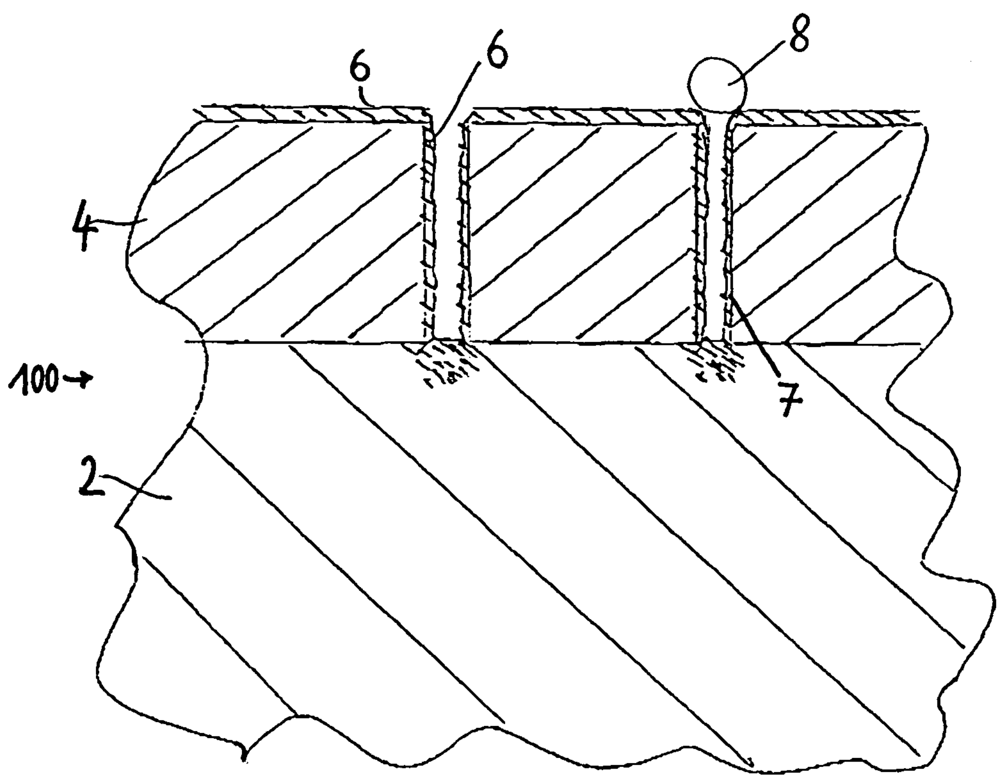

FIG. 12 shows a full-grained leather whose surface was—if at all—ground with a very fine-grained abrasive paper (grain size finer than 350) prior to the polyurethane exterior layer 4 being applied. The exterior layer 4 containing in particular pigments, a cross linking agent and a silicon emulsion and having a thickness of, for example, approximately 0.015 mm is applied by spraying it directly onto the grained surface of a preferably dyed leather 2.

In accordance with the invention it is provided that the nanoparticles are present in the finishing layer 6 in a first form, namely poly[3-((2-aminoethyl)amino)propyl]methyl (dimethyl)-siloxane, in particular 2-hexyloxyethoxy-timed, and/or in a second form, namely poly[3-((2-aminoethyl) amino)propyl]methyl(dimethyl)siloxane, in particular methoxy-timed.

"Predominant size" means that at least 50 to 80%, in particular 60 to 95%, of the nanoparticles present are of the size indicated in the characteristics of claim 23.

The finishing layer 6 provided in accordance with the invention perfectly adapts to the surface structure of the exterior layer 4 containing polyurethane. The exterior layer 4 may be so thin to make the hair pores of a full-grained leather visible. It may also be thicker and have an embossing; it may possess an imagination or man-made surface; it may have been applied directly or indirectly on the natural leather 2. Its application on the new leather with a nubuck-like exterior surface is particularly preferred.

In contrast to conventional finishing layers containing silicon emulsions with emulsifiers, the finishing layer 6 leads to unadulterated test results, particularly in the determination of abrasion resistances, while conventional abradable silicon emulsions settle on the test object and adulterate the test result.

The finishing layer 6 may also contain small amounts of organic components such as, for example, ethylene glycol monobutyl ether with which the nanoparticles are bonded among each other and with the exterior layer 2 containing polyurethane. These cross linked or, respectively, bonding components have so far not been taken into account in the listing of the component parts of the finishing layer 6.

In accordance with the invention, the wicking action of the sewing thread in the stitching area of, for example, shoes or automobile seats can be eliminated through a subsequent application of the low viscosity, transparent nano-silicon dispersion. An already existing finishing layer 6 will not impede this process.

The exterior layer 4 containing polyurethane, a solidified aqueous dispersion or, respectively, applied as an aqueous dispersion, contains pigments and is cross linked in particular with a modified polyisocyanate. Preferably, it may also [contain] coarser silicon particles with sizes of between 1 and 100 μm and/or liquid silicon which is admixed via an aqueous silicon emulsion of the polyurethane dispersion containing emulsifiers.*

It has been found that even in the case of a semi-anilin leather—this is understood as full-grained imbued leather with a polymer overlay of less than 0.03 mm thickness, with such overlay having end-to-end capillaries—, watery, no longer removable soiling neither occurs on its surface 3 nor in the leather 1 because, as shown in FIG. 11, the leather itself is also partially hydrophobic and the establishment and adhesion of soiling in the leather itself are prevented or impeded. The dirt-repellent effect is greatly reinforced by means of a nubuck-like construction of the exterior surface 40 of the exterior layer 4 as indicated in FIG. 11.

In the case of full-grained leather, the thin, extremely fine-particled silicon emulsion penetrates the fines capillaries 7 and partially penetrates into the leather 2 at the end of the capillaries 7 in area 4. Because of that, leathers 100 coated in that manner will exhibit similar water-repellent behavior as in the [case] of hydrophobically equipped leather, but without the disadvantages that those leathers possess.*

The exterior layer 4 as well as any silicon emulsions potentially present in this layer 4 which will always make the application of new layers difficult due to their separator properties, will in this case lead to an improved bonding of layer strata 4 and 6, obviously due to the fact that the nano-particles of layer 6 bond with the microparticles in the exterior layer 4.

The characteristic fact—which so far has been given a negative rating—that the overlay or, respectively, the coating 5 does not contain any nano-particle silicones but silicones that were added to the overlay by means of emulsifiers and water in the way the finishing layer has been made so far will lead, in accordance with the invention, to a good bonding of the overlay 5 or, respectively, the exterior layer 4 with the finishing layer 6 and to improved properties in every respect.

It is above all the interaction of layers 4 and 6 which are made of different materials that will result in these greatly improved properties of the leather 100.

The extremely fine polysiloxane nanoparticles of the layer 6 will also penetrate into the microscopically rough surface indentations of the polyurethane exterior layer 4.

The microscopic roughness of the exterior layer 4 is unavoidable because it results from the simple fact that the particles of the polyurethane dispersion forming them are larger than 2 μm and frequently larger than 5 μm. This will enable the nanoparticles of the finishing layer 6 to settle in these microscopically rough indentations.

This arrangement of the layer 6 on and, in a way, in the surface of the exterior layer 4 results in considerable product improvements, above all in the mechanical/physical domain and in particular in the haptics of the new leather 100 because the finishing layer 6, in contrast to a conventional polyurethane finishing layer, has no microscopic roughness or, respectively, only to a much lesser degree.

Another advantage results from the great temperature stability which shows no changes within a temperature range of between −30° C. and +200° C.

The interaction, i.e. the fact that the extremely fine silicon nanoparticles of the finishing layer 6 also penetrate into the microscopically fine indentations or, respectively, into the micro-indentations 41 of the polyurethane exterior layer 4 causing the nubuck effect from where they can no longer be removed, leads to the layer 3 being extremely abrasion resistant and water repellent. An attempt to grind the nano-layer 6 with an abrasive paper having a grain size of 220 and a pressure of 500 g/cm$^2$ 20 times yielded the surprising result that in the end the hydrophobic properties remained fully intact.

The test was done on the basis of VESLIC in accordance with DIN 11640.

Following the test, the surface did not show any change even at 6-fold magnification.

As a general comment it is observed that the exterior layer 4 or, respectively, the polyurethane coating advantageously contains coarser silicon particle between 1 and 100μ. These solid particles are to be understood as polysiloxane particles or, respectively, polysiloxane resin particles.

It was furthermore found that a silicon dispersion or, respectively, emulsion applied on the surface of the exterior layer 4—like the finishing layer 6—will act even more hydrophobic if not only nanoparticles but also microparticles are contained or, respectively, used in it, i.e. if nanoparticles and microparticles form this layer 6. It may be useful if a dispersion is used that forms the layer 6 exclusively with microparticles. Advantageously, 40 to 60 percent by weight or percent by volume of microparticles and 40 to 60 percent by volume or weight of nanoparticles are used. In particular, equal amounts may be used.

In order to reach the stringent requirements for safety shoes of Group 2 (corresponding to DIN EN ISO 20345-20347) and only a certain water absorption by the leather as well as no or only a minor water passage with a preset water vapor permeability, it makes sense in accordance with the invention to use leather, preferably split leather which, while not hydrophobically equipped because that might lead under certain circumstances to insufficient adhesion with the aqueous coatings, but to use leathers that pass the wicking test, in combination with the exterior layer 4 in accordance with the invention with its hydrophobic surface layer 6 that meet these parameters excellently particularly when the leathers are coated or, respectively, impregnated on their backside with the polysiloxane dispersion or, respectively, emulsion containing nano and/or microparticles. In that case the leathers will not absorb water not only from their upper side even if they are equipped there with pores for water vapor permeability but also from the backside.

It is important that the glue layer be soft in its use so as to improve its haptics particularly if the leather or, respectively, the exterior layer is to have the appearance of nubuck leather.

In accordance with the invention, acrylates are added as softening agents to the dispersion containing crystalline polyurethane or, respectively, to the polyurethane dispersions, to wit those that by themselves would lead to extremely soft, gooey films with a hardness of less than 15 Shore A, to wit in an amount that the connecting layer 3 or connecting layers 3', 3" are formed with 10 and 45 percent by volume of acrylate relative to the polyurethane contents of the connecting layer or layers.

For the purpose of the invention, goat leather may also be equipped or, respectively, used with the coating in accordance with the invention. The nubuck visual appearance is of particular interest for this purpose.

In accordance with the invention, silicon resin particles having a size of less than 20μ, preferably of less than 6μ, may be present in the exterior layer 4 alone or in addition to the other silicon caoutchouc particles and/or higher molecular silicon particles with a volume contents of up to 7%. Advantages are created if the nano resin particles, in combination with the silicon micro and/or nanoparticles, form the this finishing layer 6, particularly in the case of leather with a nubuck-like surface character. In the case of nubuck leather, the silicon resin particles may also form the layer 6 by themselves. The resin particles are applied on the coated leather as dispersion or emulsion at the end of the manufacturing process.

It must be noted that the surface layer 4 may have pores and capillaries due to the manufacturing process. These openings can be closed again; such a surface is considered to be waterproof but not necessarily water vapor-proof and airtight.

Thus, waterproof does not mean that water vapor will not pass through. Water vapor permeability from the leather side will always be present. If the case arises that the water vapor permeability is too low for safety shoes, perforations could be added. But even if pores and capillaries are present in the exterior layer 4, the latter will not absorb any water because it contains considerable amounts of silicon and because it is also water-repellent due to the hydrophobic layer 6.

The invention claimed is:

1. A coated leather with any fine to coarse-grained surface structure, comprising:

a coating with a nubuck-like appearance formed by an exterior surface layer of a mechanically and moisture-resistant polymer bonded to a surface of the leather or split leather by way of a polymer-based adhesive layer;

said exterior surface layer being formed of soft polyurethane and having an interior smoothness, and being formed, in a non-embossed area, with closely packed micro-indentations that are closed towards the leather and open towards an exterior and that are distributed substantially in a soap-foam cell arrangement;

said micro-indentations having an interior width of less than 130 μm, and a substantially hemi-spherical bowl-shaped concave surface turned towards an outside and being homogeneously glossy and smooth; and thin cross-linked bars individually bounding said micro-indentations and having a matte or fine-fibrous fine/coarse structure surface.

2. The leather according to claim 1, wherein said interior width of said micro-indentations is less than 80 μm.

3. The leather according to claim 1, wherein:

said adhesive layer includes an intermediate layer stratum and a connecting layer stratum and said exterior layer is prefabricated from an aqueous, predominantly polyurethane-containing synthetic dispersion on a hot silicon base, which is optionally structured in nubuck-like fashion and free of tin or tin-organic compounds;

said adhesive layer being formed below said exterior layer and predominantly of a polyurethane-containing synthetic dispersion which was applied on the leather and which is connected with the intermediate layer stratum;

said tin-free exterior layer having an exterior layer surface formed by way of a negative, nubuck-like embossing and made of a polymer, containing at least one silicon polymer or, respectively, silicon additive, being formed with a multitude of voids selected from the group consisting of hollow spaces, hollow ducts, capillaries, pores or openings, and recesses, hollows or indentations having a small interior width and starting on a side turned to said intermediate layer stratum and fully penetrating the exterior layer and the exterior layer surface and/or ending within said exterior layer;

said voids being filled with form or filling material, stalagmites, pins, rods, cylinders, or cones that form single-pieces with the polymer material of said intermediate layer stratum of said adhesive layer and which penetrate and close the same and which are bonded flush with and, optionally, anchored to the interior walls.

4. The leather according to claim 3, which comprises, in addition to the single-part polymer material that is identical to the polymer material of said intermediate layer stratum and has penetrated into said voids and fills the same as a filling material, filling form materials made of the single-part polymer material identical to the polymer material of said connecting layer stratum completely penetrated into and anchored in the walls of the form filling materials or, respectively, into hollow spaces of materials filling the voids in said exterior layer stratum starting there on the underside and ending in the same or extending to the surface of the exterior layer.

5. The leather according to claim 4, wherein said single-part polymer is polyurethane.

6. The leather according to claim 4, wherein said voids in the form of hollow spaces, hollow ducts, capillaries, pores and/or openings, recesses or indentations that are completely filled with the polymer material of at least the intermediate layer stratum are present in the exterior layer on average between 28 and 3 per $cm^2$.

7. The leather according to claim 6, wherein said voids are present at a density between 18 and 5 per $cm^2$.

8. The leather according to claim 1, wherein said voids in the form of the hollow spaces, hollow ducts, capillaries, or pores are present in the exterior layer and extending to or, respectively, reaching the exterior surface have inner widths with diameters ranging from 10 to 100 μm.

9. The leather according to claim 1, wherein said openings, recesses or indentations present in the exterior layer but not extending to the exterior surface substantially have inner widths with diameters ranging from 10 to 100 μm.

10. The leather according to claim 1, wherein a ratio of said hollow spaces, hollow ducts, capillaries or pores extending to and piercing the exterior surface of said exterior layer to said openings, recesses or indentations ending within said exterior layer ranges between 30 to 10% and 70 to 90%.

11. The leather according to claim 1, wherein a ratio of said hollow spaces, hollow ducts, capillaries or pores extending to and piercing the exterior surface of said exterior layer to said openings, recesses or indentations ending within said exterior layer ranges between 25 to 15% and 75 to 85%.

12. The leather according to claim 1, wherein the exterior layer with the micro-indentations and the surface-matte bars encircling them is formed of a soft cross-linked polyurethane having a hardness of less than 75 Shore A.

13. The leather according to claim 12, wherein the hardness is less than 55 Shore A.

14. The leather according to claim 1, wherein micro-indentations formed in the exterior layer each have closed borders (bars) merging with each other and having a polyhedral or hexagonal cross section.

15. The leather according to claim 1, wherein an interior width of said micro-indentations amounts to 20 to 100 μm, a depth of said micro-indentations amounts to 5 to 80 μm, and a thickness of the bars between said micro-indentations amounts to 1 to 30 μm.

16. The leather according to claim 1, wherein an interior width of said micro-indentations amounts to 30 to 80 μm, a depth of said micro-indentations amounts to 10 to 60 μm, and a thickness of the bars between said micro-indentations amounts to 1 to 30 μm.

17. The leather according to claim 1, wherein said exterior layer has a primarily round-celled surface structure formed during a grinding of foamed synthetic material or rubber transferred by a silicon matrix provided for the structure of the exterior or, respectively, surface and of the pores.

18. The leather according to claim 1, wherein between 1.5 and 20 percent by weight, in the case of grain leather or leather with a technical surface between 4 and 12 percent by weight, or in the case of a nubuck-type leather surface, between 10 and 18 percent by weight of at least one silicon or, respectively, of one polysiloxane, is contained in said exterior layer, in each case relative to an overall weight of said layer.

19. The leather according to claim 18, wherein said polymer of said exterior layer is cross-linked polyurethane containing polysiloxane particles with a particle size of maximally 30 μm up to a volume share of maximally 15%.

20. The leather according to claim 19, wherein said silicon or, respectively, said polysiloxane is embedded in said exterior layer in the form of caoutchouc-like solid particles.

21. The leather according to claim 20, wherein said caoutchouc-like solid particles are micro-particles.

22. The leather according to claim 19, wherein said silicon or, respectively, said polysiloxane particles are present in the form of higher-molecular polysiloxane oils with molecular weights of approximately 2,000 to approximately 100,000, that were incorporated in the polyurethane of said exterior layer via an aqueous emulsion prior to a cross-linking thereof.

23. The leather according to claim 19, wherein said particles have a molecular weight greater than 5,000.

24. The leather according to claim 19, wherein, in addition to the very small solid silicon or, respectively, polysiloxane particles, said exterior layer also has higher molecular silicones incorporated therein made from a dispersion formed with a medium hard ramified polyurethane subsequently solidified or, respectively, cross-linked.

25. The leather according to claim 19, wherein the cross-linked polyurethane of said exterior layer contains hollow microspheres.

26. The leather according to claim 25, wherein said hollow microspheres are made of a thermoplastic synthetic with a diameter of maximally 60 μm and in an amount of between 0.3 to 8 percent by volume, in each case relative to an overall coating.

27. The leather according to claim 1, wherein a thickness of said exterior layer amounts to 0.04 to 0.1 mm.

28. The leather according to claim 1, wherein said exterior layer is formed with any desired surface or embossing structure and/or matteness, to provide a visual appearance and a touch of a nubuck leather with a microscopically rough surface formed with elevations and indentations ranging from 0.005 to 0.02 mM.

29. The leather according to claim 1, wherein said adhesive layer includes an intermediate layer stratum and a connecting layer stratum, and said intermediate layer stratum is made of an ultimately solidified or, respectively, cross-linked polyurethane dispersion that, prior to its cross-linking, had thermoplastic properties and a substantially non-ramified or, respectively, linear structure and high adhesive properties.

30. The leather according to claim 29, wherein said intermediate layer stratum and/or said connecting layer stratum contains hollow microspheres with a volume share of maximally 10%.

31. The leather according to claim 1, which comprises a thin water-repellent finishing layer forming a continuous film on the exterior side of said exterior layer and being formed of silicon particles in a nanometer range.

32. The leather according to claim 31, wherein said finishing layer is substantially free of emulsifiers and connected with said polymer material of said exterior layer in a substantially inseparable connection.

33. The leather according to claim 31, wherein a predominant size of said silicon particles in said finishing layer forming the continuous film lies within a range of 1 to 25 nm.

34. The leather according to claim 31, wherein a predominant size of said silicon particles in said finishing layer forming the continuous film lies within a range of 8 to 16 nm.

35. The leather according to claim 31, wherein a thickness of said finishing layer amounts to 0.0005 to 0.009 millimeters and/or the finishing layer has a density of less than 1.

36. The leather according to claim 35, wherein the thickness of said finishing layer amounts to 0.003 to 0.007 millimeters.

37. The leather according to claim 31, wherein said coating is an open-pored polyurethane coating formed with voids selected from the group consisting of capillaries, perforations, pores, and said voids a lined or coated with said finishing layer.

38. The leather according to claim 31, wherein said nanoparticles in said finishing layer are made of polydimethylsiloxane.

39. The leather according to claim 31, wherein said nanoparticles are present in the finishing layer in a first form and/or in a second form, the first form comprises poly[3-((2-aminoethyl)amino)propyl]methyl(dimethyl)siloxane, said second form comprises poly[3-((2-aminoethyl)amino)propyl]methyl(dimethyl)-siloxane, and a ratio of said first form to said second form lies between 7:1 and 3:1.

40. The leather according to claim 39, wherein said first form comprises 2-hexyloxyethoxy-ended poly[3-((2-aminoethyl)amino)propyl]methyl-(dimethyl)siloxane, said second form comprises methoxy-ended poly[3-((2-aminoethyl) amino)propyl]methyl(dimethyl)siloxane, and the ratio of said first form to said second form lies between 6:1 and 4:1.

41. The leather according to claim 31, wherein said finishing layer is a transparent layer made of a transparent solidified silicon emulsion.

42. The leather according to claim 31, wherein said finishing layer is a continuous thin film free of volatile components.

43. The leather according to claim 31, wherein said finishing layer contains diethylene glycol monobutyl ether in an amount of less than 1 percent by weight.

44. The leather according to claim 31, wherein said finishing layer possesses a polyisocyanate share of between 1 and 15 percent by weight relative to a share of said silicon nanoparticles.

45. The leather according to claim 44, wherein said polyisocyanate share is between 1 and 7 percent by weight relative to the share of said silicon nanoparticles.

46. The leather according to claim 45, wherein said polyisocyanate share lies between 1 and 5 percent by weight.

47. The leather according to claim 31, wherein any stitchings present in the leather and/or walls of stitching holes are coated with said finishing layer and said finishing layer is emulsifier-free.

48. The leather according to claim 1, wherein said polymer materials are substantially free of any silicon and fluoropolymer.

49. The leather according to claim 48, wherein said polymer materials are polyurethane materials of said intermediate layer stratum and of said connecting layer stratum are substantially free of silicon and fluoropolymers.

50. The leather according to claim 1, wherein said polymer materials of said intermediate layer stratum and of said connecting layer stratum have substantially identical compositions and/or starting molecule sizes.

51. The leather according to claim 1, wherein said coating is a water-repellent coating having a coating thickness of maximally 0.15 mm and having substantially no or a defined water vapor permeability.

52. The leather according to claim 51, wherein the thickness of said water-repellent coating is less than 0.12 mm.

53. The leather according to claim 1, wherein said intermediate layer stratum and said connecting layer stratum connected with said intermediate layer stratum and with the leather surface together have a greater layer thickness than said exterior layer.

54. The leather according to claim 53, wherein the thickness of said exterior layer amounts to between 30 and 45% and a combined thickness of said intermediate layer stratum and said connecting layer stratum amounts to between 70 and 55% of an overall thickness of said coating.

55. The leather according to claim 1, wherein each of the layers and layer strata forming said coating of the split leather is kept free of tin and any tin compound.

56. The leather according to claim 1, wherein said coating, and said exterior layer thereof, is pierced all the way into the leather by mechanically created hole perforations.

57. The leather according to claim 56, wherein said hole perforations have a characteristic of having been created by hole pipes or needles.

58. The leather according to claim 56, wherein said exterior layer an inner wall surfaces of said hole perforations are coated with a water-repellent nano finishing layer made of a silicon polymer.

59. The leather according to claim 58, wherein said finishing layer has a thickness of 0.001 to 0.004 mm.

60. The leather according to claim 1, wherein said coating formed by said exterior layer and said adhesive layer has penetrated into the leather in order to improve a water vapor permeability of hole perforations formed therein by way of spark erosion (corona technique).

61. The leather according to claim 1, wherein hole perforations are entered to a depth of maximally 60% of a sum of a thickness of the leather plus a thickness of said coating.

62. The leather according to claim 61, wherein said hole perforations are distributed with a density of 3 to 65 per $cm^2$ and with an interior width of 0.01 to 0.8 mm.

63. The leather according to claim 62, wherein said hole perforations are distributed with a density of 8 to 18 per $cm^2$.

64. The leather according to claim 1, wherein said polymer material is cross-linked polyurethane and wherein very fine-particled inorganic powders are interspersed in said cross-linked polyurethane of said connecting layer stratum.

65. The leather according to claim 64, wherein said inorganic powders are ceramic powders or quartz powders with a particle size of maximally 60 μm and in a quantity of 0.3 to 10 percent by weight relative to a share of cross-linked polyurethane.

66. The leather according to claim 1, which comprises a weave or fabric of fibers of a cut-resistant material disposed between the substrate leather and said exterior layer.

67. The leather according to claim 66, wherein said fibers are polyaramide fibers with a mass per unit area of 40 to 85 $g/m^2$.

68. The leather according to claim 1, wherein an interior side of the substrate leather is coated with silicon emulsion and/or a backside of the leather, for reducing water absorption, is coated or impregnated with a solidified silicon dispersion or silicon emulsion containing solid polysiloxane particles in a nanometer and/or micrometer range.

69. A safety shoe, comprising leg material at least partially made of the leather according to claim 1.

70. A leather assembly for safety shoes, comprising:

a leather having a thickness of between 1.7 and 2.2 mm and formed in accordance with claim 1;

a polysiloxane impregnation absorbed or infiltrated maximally 0.6 mm into a leather back side; and a remaining portion of the leather up to the connecting layer being free of polysiloxane and said remaining portion absorbing little water at a cut edge, thus passing the wicking test.

71. A silicon emulsion containing emulsifier-free, aqueous, fine-particled nanoparticles and configured for the hydrophobization of leather through direct application on a surface of a leather body having a polyurethane exterior layer and a finishing layer firmly attached to the exterior layer.

72. An article made from the leather according to claim 1, the article being in the form of shoes, safety shoes, purses, leather garments, surfaces and covers in vehicles, protective garments made of leather, suitcases, seating and reclining furniture.

* * * * *